Feb. 26, 1935.  B. M. HYMAN  1,992,429
WAGON HITCH FOR IMPLEMENTS
Filed Dec. 13, 1933
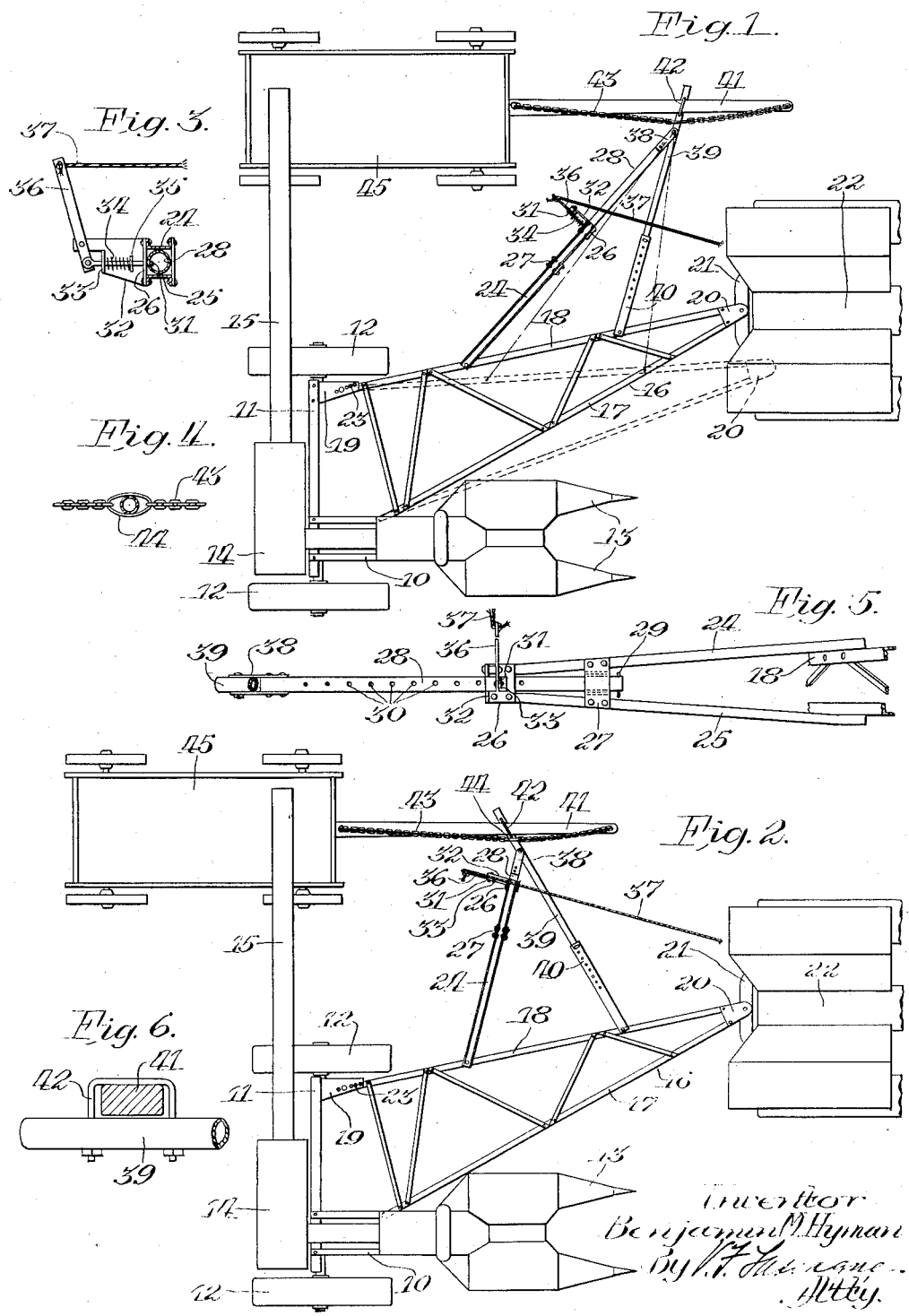

Patented Feb. 26, 1935

1,992,429

UNITED STATES PATENT OFFICE 1,992,429

WAGON HITCH FOR IMPLEMENTS

Benjamin M. Hyman, Moline, Ill., assignor to International Harvester Company, a corporation of New Jersey Application December 13, 1933, Serial No. 702,130

8 Claims. (Cl. 280—33.44)

This invention relates to a wagon hitch for implements. More particularly it relates to a hitch for drawing wagons in laterally offset position along a harvester drawn by a tractor.

In the operation of tractor drawn harvesters in which wagons or other wheeled vehicles are utilized for receiving the harvested crop, hitches are utilized for pulling the wagon alongside the harvester in a laterally offset position. Such hitches are particularly desirable to balance the offset portion of the harvester which must necessarily be positioned laterally of the tractor to avoid passing of the tractor over unharvested portions of the field. As the laterally extending elevator utilized in harvesters of this general type are usually fixed in position, it is necessary in order to completely fill a wagon to move the wagon longitudinally as successive portions are filled.

In implements of the type above referred to it is also necessary at times, particularly in harvesting row crops, to change the offset position of the harvester with respect to the tractor to take care of different width spacings of the rows. Such an adjustment is most easily taken care of by angular movement of the draft portion of the implement frame, such as disclosed and claimed in the United States Patent 1,906,606, May 2, 1933. When such an adjustment is made, the laterally extending wagon hitch, which is conveniently carried by said draft portion, is also angled, and its hitch point must be corrected by adjustment.

The principal object of the present invention is to provide an expansible or collapsible hitch which may be remotely controlled from the operator's position on the tractor to provide for shifting the receiving wagon longitudinally of the delivering elevator. Another principal object is to provide an adjusting means on a hitch carried by a draft frame to compensate for adjustment of the draft frame for varying the offset position of the harvester. These objects and others, which will be apparent from the detailed description to follow, are accomplished by a construction such as shown in the attached drawing, in which:

Figure 1 is a top plan view of a corn harvester drawn by a tractor, the rear end of which is shown, and provided with a wagon for receiving the harvested material;

Figure 2 shows the same machine as Figure 1 with the wagon embodying the invention in its rearmost adjusted position;

Figure 3 is an enlarged detail showing a latch means for remotely controlling the folding or collapsing of the wagon hitch;

Figure 4 is an enlarged detail showing the connection of the wagon drawing chain with a member of the hitch;

Figure 5 is an enlarged elevation showing the collapsible compression member of the hitch structure; and, Figure 6 is an enlarged detail showing the slidable connection of the wagon tongue on one of the hitch structure members.

In the drawing, a corn picker having a frame structure 10 including a transverse portion 11 and wheels 12 carried at the ends of said transverse portion has been shown. Said corn picker is also provided with transversely spaced gathering shoes 13 for guiding the stalks into the throat of the picker. A husking unit 14 may be utilized on the picker and an upwardly and laterally extending elevator 15 is provided for conveying the harvested material, which, in the machine illustrated, comprises ears of corn.

A draft frame 16 consists of a portion 17 pivoted to the frame structure 10 of the corn picker on a vertical axis substantially in alignment with the gathering portion of the picker, a portion 18 detachably secured to a bracket 19 secured to the frame structure 10 adjacent the inner wheel, and a connecting member 20 which joins the forwardly converging ends of the side portions and forms a means for pivotally connecting the draft frame to the drawbar 21 of a tractor 22.

A plurality of openings 23 are provided in the attaching bracket 19 arranged on the circumference of a circle having its center on the pivot point of the other side of the draft frame on the frame structure 10. These openings provide for angularly adjusting the draft frame 16 with respect to the frame structure 10 of the corn picker. It will be understood that this adjustment changes the laterally offset position of the corn picker with respect to the tractor. The construction of the draft frame and the harvester frame structure have been shown diagrammatically, reference being made above to a patent which discloses and claims such a construction.

The side portion 18 of the draft frame includes vertically spaced bars, as shown in Figure 5. Angle bars 24 and 25, mounted, respectively, above and below said side portion 18 forwardly of the wheel 12 at that side of the harvester, extend forwardly and converge, being connected at their outer ends by spaced plates 26 and 27. The bars 24 and 25 are pivotally connected on a vertical axis to the side portion 18 of the draft frame.

A pipe 28 is slidably mounted between the plates 26 and 27, which, as shown in Figure 3, are mounted on both sides of the bars 24 and 25. A key 29 at the inner end of the pipe 28 limits the outward movement of said pipe with respect to the bars 24 and 25. A plurality of openings 30 are formed in the pipe 28 to provide means for engagement therewith of a latch 31. Said latch is mounted on a support 32 extending laterally from one of the plates 26. Said plate, together with a bent-over flange 33 on the member 32, is provided with aligned openings through which the latch 31 slidably extends. A spring 34 seated against the stop 35 on the latch 31 and against the flange 33 holds the latch resiliently against the pipe 28 and engages said latch with one of the openings 30 when said opening comes into alignment therewith. A lever 36 pivoted on an extension of the member 32 is pivotally connected to the latch 31 for withdrawing said latch from locking position. A flexible element 37, which may be a chain, a cable, a rope, or a similar flexible element, is connected to the lever 36 and extends to a location within reach of the operator on the tractor, whereby the latch 31 may be remotely controlled.

A pair of spaced plates 38 rigidly secured to the pipe 28 at its free end provide means for pivotally connecting said pipe with a second pipe 39, which forms the tension member of the hitch. Said pipe 39 is adjustably connected to a member 40 by a plurality of openings in said member, whereby its longitudinal position relative to the pipe 39 may be adjusted. The member 40 is pivotally connected on a vertical axis to the side portion 18 of the draft frame 16. Although both the compression portion and the tension portion of the laterally extended draft hitch consists of two sections, the hitch may be referred to as having a compression member, the length of which may be adjusted by a remotely controlled latch, a tension member, the length of which may be manually adjusted to provide for variation in offset.

The pipe 39 extends outwardly beyond its pivotal connection with the pipe 28 to form a support for a wagon tongue 41. Said tongue slidably extends through a yoke 42 secured at the outer end of the pipe 39. The weight of the tongue is carried on said pipe. Due to the double bar construction of the compression portion of the hitch frame, a truss beam effect is obtained which provides sufficient strength for supporting the wagon tongue 41 at the outer end of the pipe 39. A chain 43 connected at longitudinally spaced points to the tongue 41 contains intermediate its ends a large ring 44, through which the pipe 39 passes. By this construction, the tongue 41 is held against longitudinal movement with respect to the hitch, and draft means is provided for the wagon. The tongue 41 is part of a conventional wagon 45. It is to be understood that any wheeled vehicle which is suitably constructed could be used in the same manner as a wagon.

In the operation of a row crop harvester as above described, the draft frame 16 is adjusted on the frame structure 10 to place gathering shoes 13 in proper position for harvesting row crops. It is desirable that the tractor operate along a certain line of movement with respect to the rows. With this position determined, the draft frame is then adjusted with the gathering shoes in proper alignment with the rows. At the same time that the angular adjustment of the draft frame is made, the hitch is also adjusted by relative movement of the member 40 along the pipe 39 to locate the wagon in the proper offset position. It is desirable to balance the complete draft load of the tractor as much as possible, to prevent side draft which results in the harvester drifting away from the rows being harvested.

With the harvester in operation, as shown in Figure 1, with the wagon in forward position, the rear end of the wagon is first filled from the elevator 15. As said portion is filled, the operator, either by stopping the tractor or in some cases with the tractor in operation, releases the latch 31 by remote control means 37, whereby the pipe 28 telescopes into the truss portion of the compression member. By this means the wagon hitch is collapsed, moving the support for the wagon tongue rearwardly. Any amount of movement may be brought about depending upon the telescoping of the pipe 28. In Figure 2 the hitch is shown in completely collapsed position with the pipe 28 telescoped in the truss portion of the compression member. In this position the elevator 15 delivers to the front of the wagon.

In the consideration of this structure, it should also be noted that by backing the tractor and the harvester with the latch in released position, the hitch may be unfolded or moved to its forward position. It is not necessary, therefore, at any time to manually adjust the position of the hitch. For this reason the hitch may be referred to as power operated, its adjustment being obtained in either position by operating the tractor to draw or push the implement.

It is to be understood that applicant has shown and described only a preferred embodiment of his improved wagon hitch for harvesters and that he claims as his invention all modifications of the same falling within the scope of the appended claims.

What is claimed is:

1. A wagon hitch comprising, in combination with a power propelled frame structure, a collapsible hitch frame extending laterally from said frame structure, means for supporting a wagon tongue at the outer end of said frame, a latch device for holding said frame in a plurality of adjusted positions, and means for operating said latch device.

2. A wagon hitch comprising, in combination with a power propelled frame structure, a collapsible hitch frame extending laterally from said frame structure, means for supporting a wagon tongue at the outer end of said frame, a latch device for holding said frame in a plurality of adjusted positions, and remote control means for manually operating said latch device.

3. A wheeled implement frame, a draft frame rigidly secured to said frame for angular adjustment about a vertical axis with respect thereto, said frame adapted to be pivotally secured to the drawbar of a tractor, a wagon hitch secured to the draft frame and extending laterally therefrom, said draft frame being collapsible to shift the wagon in a fore and aft direction, and means for controlling the collapse of said hitch from the operator's station on the tractor.

4. A wheeled implement frame, a draft frame rigidly secured to said frame for angular adjustment about a vertical axis with respect thereto, said frame adapted to be pivotally secured to the drawbar of a tractor, a wagon hitch secured to the draft frame and extending laterally therefrom, said hitch being adjustable to correct its position upon angular adjustment of the draft frame, said draft frame being collapsible to shift the wagon in a fore and aft direction, and means for controlling the collapse of said hitch from the operator's station on the tractor.

5. A wagon hitch device for a tractor drawn implement comprising, in combination with the tractor, a wheel supported implement frame, a draft frame rigidly secured to said frame for angular adjustment about a vertical axis to vary the offset relation of the implement, said draft frame being pivotally connected to the tractor, a hitch structure pivotally connected to the draft frame on a vertical axis and extending forwardly and laterally therefrom, said structure including a telescopic compression member, a latch on said member engageable in a plurality of positions to hold the structure in a plurality of telescoped positions, and means for securing a wagon tongue to the outer end of the hitch structure.

6. A wagon hitch device for a tractor drawn harvester comprising, in combination with the tractor, a wheel supported harvester frame pivotally connected to the tractor, a wagon located laterally of said frame having draft means extending forwardly therefrom, a telescoping hitch structure connected to the harvester frame and to said draft frame, and latch means incorporated in the hitch structure, said structure being operable by movement of the tractor upon actuation of the latch means to move the position of the wagon longitudinally of the harvester frame.

7. A wagon hitch device for a tractor drawn harvester comprising, in combination with the tractor, a wheel supported harvester frame pivotally connected to the tractor, a wagon located laterally of said frame having draft means extending forwardly therefrom, means for conveying harvested material from the harvester to said wagon, a hitch structure connected to the harvester frame and to said draft frame, and telescoping and latch means incorporated in the hitch structure, said structure being operable by movement of the tractor upon actuation of the latch means to move the position of the wagon longitudinally of the harvester frame.

8. A wagon hitch comprising, in combination with a frame structure, a telescopic compression member pivotally connected on a vertical axis to said frame structure and extending laterally and forwardly therefrom, a tension member connected to the frame structure forwardly of the compression member and connected to the outer end of said member, means for supporting a wagon tongue at the outer end of said members, a latch means mounted on the telescopic member for holding said member in any one of a pluraity of adjusted positions, and manually operable remote control means for releasing said latch device.

BENJAMIN M. HYMAN.